No. 831,088. PATENTED SEPT. 18, 1906.
B. McCAUGHEY.
DRIP PAN.
APPLICATION FILED MAR. 1, 1906.
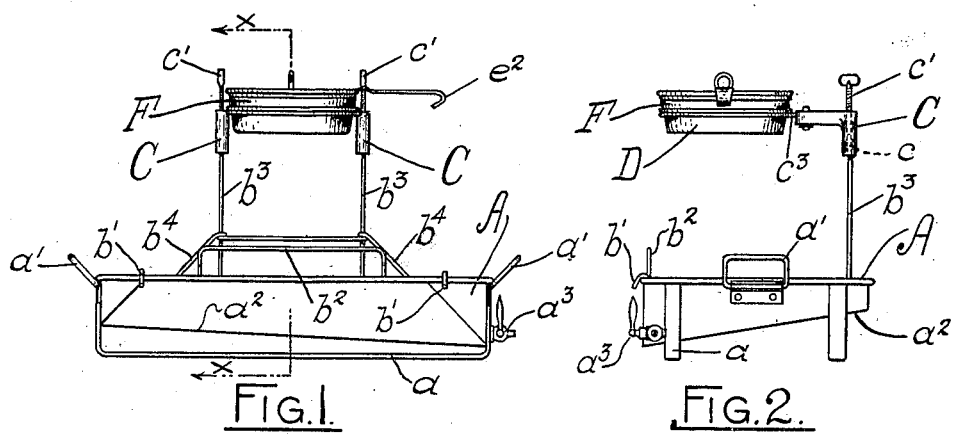
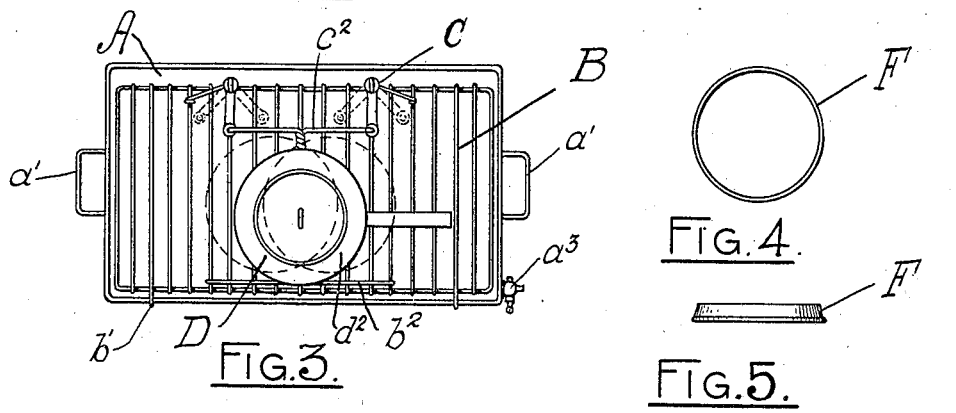
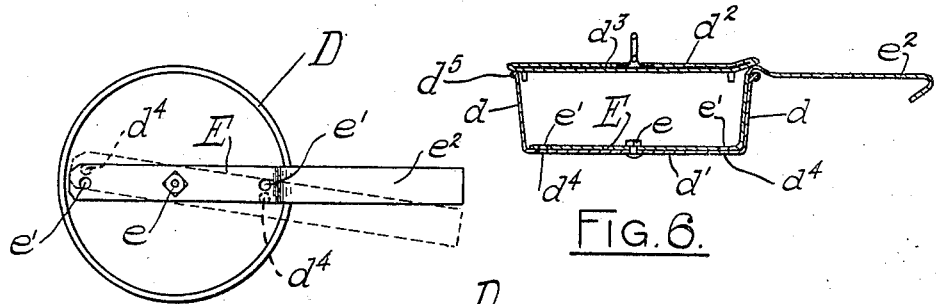
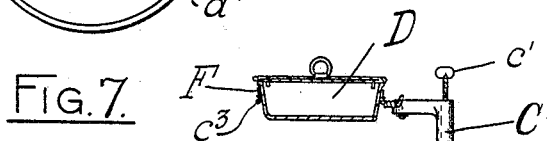
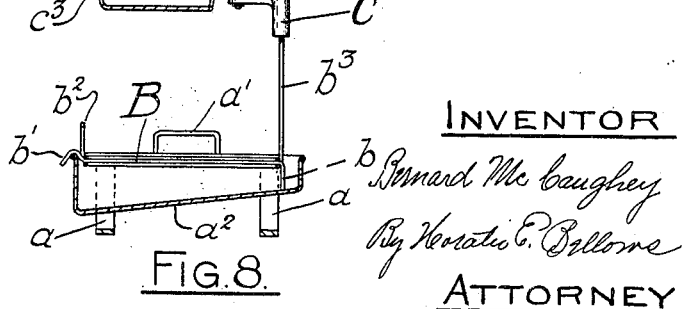
WITNESSES.
A.G. Pieczentkowski.
James T. Toole.
INVENTOR
Bernard McCaughey
By Horatio E. Bellows
ATTORNEY

UNITED STATES PATENT OFFICE.

BERNARD McCAUGHEY, OF PAWTUCKET, RHODE ISLAND.

DRIP-PAN.

No. 831,088.      Specification of Letters Patent.      Patented Sept. 18, 1906.

Application filed March 1, 1906. Serial No. 303,636.

*To all whom it may concern:*

Be it known that I, BERNARD McCAUGHEY, a citizen of the United States, residing at Pawtucket, in the county of Providence and State of Rhode Island, have invented certain new and useful Improvements in Drip-Pans, of which the following is a specification, reference being had therein to the accompanying drawings.

My invention relates to drip-pans, and has for its objects the ends commonly sought by this class of devices, but more particularly is it desired to provide a means for basting the meat thoroughly without flushing the same, to control the location of application of the basting liquid, to furnish a ready means of collecting the liquids for repeated use, to provide both attached and detachable means for governing the height of the basting means above roasts of varying size, to provide means for controlling the drip in accordance with the consistency of the gravy used, also to insure against excessive heat upon the basting-receptacle, and to furnish means for distributing the drip where most needed.

To the above ends primarily my novel device consists of a pan having a peculiarly-inclined bottom and outlet, a vertically and horizontally adjustable basting-receptacle suspended above the pan, and a device for controlling the quantity of drip from the receptacle.

In the drawings, wherein like reference characters indicate like parts throughout the views, Figure 1 is a side elevation of my novel roaster; Figs. 2 and 3, end and plan views of the same, respectively; Figs. 4 and 5, detail views of the detachable ring; Fig. 6, a diametrical section of the drip holder and cover; Fig. 7, a plan of the holder with the cover removed, and Fig. 8 a transverse section of the entire roaster on line $xx$ of Fig. 1.

My device comprises a pan A, supported by shoes $a$ and provided with end handles $a'$. The floor $a^2$ of the pan is inclined in two directions toward one of the corners of the same, as shown in Figs. 1 and 2. In the corner referred to is inserted a faucet $a^3$ to permit the withdrawal of the accumulated liquids.

Located in the pan is a nearly horizontal rack B, supported by legs $b$, resting upon the pan-floor, and hooks $b'$, engaging the pan margin. On one side of the rack is an upright guard $b^2$ and upon the opposite side two posts $b^3$, supported by braces $b^4$. Pivotally mounted on the posts are arms C, provided at their pivotal portions with threaded openings $c$ in alinement with the posts, wherein loosely travel thumb-screws $c'$, whereby the arms C may be vertically adjusted. Connecting the free ends of the arms C is a crossbar $c^2$, carrying a horizontal ring $c^3$, the whole constituting a laterally-swinging frame above the body of the pan. Resting in the ring $c^3$ is a drip-receptacle D, comprising a slightly-inclined circular side wall $d$, a base $d'$, and cover $d^2$. The cover has an interior lining of asbestos $d^3$ to protect the contents of the receptacle from excessive heat from the oven-roof. At diametrically opposite points in the base of the receptacle are two openings $d^4$ to allow passage of the contents of the receptacle to the meat below. Experiment shows that unless protected heat will cause the liquids to soon clog these openings. To provide against this and at the same time to provide means for controlling the amount of drip, gates are formed as follows: A flat strip or bar E is pivoted by a bolt $e$ to the center of the pan and the bar provided with perforations $e'$, adapted to register with the openings $d^4$ when the bar is in one position. The bar E is bent upwardly and then projected horizontally to form a handle $e^2$. By rotating the handle $e^2$, as shown in broken lines in Fig. 7, the gates $e'$ $d^4$ are either fully opened or closed or partially opened, whereby the desired amount of drip is secured. The receptacle D normally rests by its annular flange $d^5$ upon the ring $c^3$; but if an unusually large piece of meat is roasting and it is desired to elevate the receptacle beyond the limits of the thumb-screws a removable ring F may be placed upon the ring $c^3$, and upon its upper edge the flange $d^5$ is supported.

In operation the juices collect in one corner of the pan A and are withdrawn at will through the faucet $a^3$ to be placed in the receptacle D, whose gates have been adjusted to agree with the consistency of the gravy and quantity of drip required. The operator vertically adjusts the arms C by the screws $c'$ and from time to time manually swings the receptacle to some new horizontal position. Some of these positions are shown in broken lines in Fig. 3.

What I claim is—

1. In a drip-pan the combination with the pan and rack, of posts upon the rack, arms pivoted to the posts, a frame carried by the arms, a perforated receptacle for the basting liquid mounted in the frame, and means in the receptacle for controlling the discharge of the liquid from the receptacle.

2. In a drip-pan the combination with the pan and rack, of posts upon the rack, arms pivoted to the posts, means for vertically adjusting the arms, a frame supported by the arms, and a receptacle in the frame.

3. In a drip-pan the combination with the pan and rack, of posts upon the rack, arms pivoted to the posts, a frame carried by the arms, a receptacle mounted in the frame and provided with openings through its bottom, a strip pivoted to the receptacle-bottom at a point intermediate the openings and provided with perforations adapted to register with the openings, and a handle upon the strip.

4. In a drip-pan the combination with the pan and rack, of posts upon the rack, arms pivoted to the posts, a frame carried by the arms, a receptacle for the basting liquids mounted in the frame, gates in the receptacle for egress of the liquids, a cover for the receptacle, and a heat-resisting lining in the cover.

In testimony whereof I have affixed my signature in presence of two witnesses.

BERNARD McCAUGHEY.

Witnesses:
  HORATIO E. BELLOWS,
  JAMES T. TOOLE.